US008959639B2

(12) United States Patent
Shevchenko

(10) Patent No.: US 8,959,639 B2
(45) Date of Patent: Feb. 17, 2015

(54) METHOD OF DETECTING AND BLOCKING MALICIOUS ACTIVITY

(75) Inventor: Sergei Shevchenko, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 1440 days.

(21) Appl. No.: 12/134,481

(22) Filed: Jun. 6, 2008

(65) Prior Publication Data

US 2009/0049550 A1 Feb. 19, 2009

Related U.S. Application Data

(60) Provisional application No. 60/944,608, filed on Jun. 18, 2007.

(51) Int. Cl.
*G06F 21/56* (2013.01)
*G06F 21/52* (2013.01)

(52) U.S. Cl.
CPC ............... *G06F 21/56* (2013.01); *G06F 21/52* (2013.01)
USPC ................ 726/24; 726/22; 726/23; 726/25

(58) Field of Classification Search
USPC .................................................. 726/22–25
See application file for complete search history.

(56) References Cited

U.S. PATENT DOCUMENTS

| 5,956,507 | A | * | 9/1999 | Shearer et al. | 718/104 |
|---|---|---|---|---|---|
| 5,956,710 | A | * | 9/1999 | Yarom | 1/1 |
| 5,974,549 | A | * | 10/1999 | Golan | 726/23 |
| 6,463,583 | B1 | * | 10/2002 | Hammond | 717/162 |
| 7,340,774 | B2 | * | 3/2008 | Hursey et al. | 726/22 |
| 7,398,553 | B1 | * | 7/2008 | Li | 726/22 |
| 7,665,143 | B2 | * | 2/2010 | Havens et al. | 726/26 |
| 7,673,341 | B2 | * | 3/2010 | Kramer et al. | 726/23 |
| 7,752,668 | B2 | * | 7/2010 | Omote et al. | 726/24 |
| 7,823,201 | B1 | * | 10/2010 | Xu | 726/22 |
| 7,992,156 | B1 | * | 8/2011 | Wang | 719/328 |
| 8,214,900 | B1 | * | 7/2012 | Satish et al. | 726/23 |
| 8,353,041 | B2 | * | 1/2013 | Brown et al. | 726/24 |
| 8,769,672 | B2 | * | 7/2014 | Park | 726/22 |
| 2003/0014667 | A1 | * | 1/2003 | Kolichtchak | 713/201 |
| 2004/0255163 | A1 | * | 12/2004 | Swimmer et al. | 713/201 |
| 2005/0081053 | A1 | * | 4/2005 | Aston et al. | 713/200 |
| 2005/0091558 | A1 | * | 4/2005 | Chess et al. | 714/38 |
| 2005/0120238 | A1 | * | 6/2005 | Choi | 713/200 |
| 2005/0177752 | A1 | * | 8/2005 | Hollander et al. | 713/201 |
| 2005/0188272 | A1 | * | 8/2005 | Bodorin et al. | 714/38 |
| 2006/0031937 | A1 | * | 2/2006 | Steinberg | 726/24 |
| 2006/0059339 | A1 | * | 3/2006 | Yoshida et al. | 713/166 |
| 2006/0085854 | A1 | * | 4/2006 | Agrawal et al. | 726/23 |

(Continued)

*Primary Examiner* — Peter Poltorak
(74) *Attorney, Agent, or Firm* — Holland & Hart LLP

(57) ABSTRACT

A method of detecting and blocking malicious activity of processes in computer memory during unpacking of a file after the code and data contained in the file are unpacked is described. The method includes inserting a hook function into one or more un-assessed processes running in the computer memory. A hook is then placed on one or more system calls carried out by the one or more un-assessed processes; the one or more system calls determining an optimal time period in which to detect malicious activity in the un-assessed processes. During the optimal time period the one or more system calls carried out by the one or more un-assessed processes are suspended and attributes of the one or more un-assessed processes are detected and the likely maliciousness of the one or more un-assessed processes is determined from the attributes.

17 Claims, 7 Drawing Sheets

(56) References Cited

U.S. PATENT DOCUMENTS

| | | |
|---|---|---|
| 2006/0085857 A1* | 4/2006 | Omote et al. .................. 726/27 |
| 2006/0129603 A1* | 6/2006 | Park et al. .................. 707/104.1 |
| 2006/0161988 A1* | 7/2006 | Costea et al. .................. 726/25 |
| 2006/0206937 A1* | 9/2006 | Repasi et al. .................. 726/22 |
| 2006/0265761 A1* | 11/2006 | Rochette et al. ................ 726/27 |
| 2006/0288420 A1* | 12/2006 | Mantripragada et al. ....... 726/25 |
| 2007/0016914 A1* | 1/2007 | Yeap .............................. 719/328 |
| 2007/0016953 A1* | 1/2007 | Morris et al. ................... 726/24 |
| 2007/0101435 A1* | 5/2007 | Konanka et al. ................ 726/27 |
| 2007/0143843 A1* | 6/2007 | Nason et al. .................... 726/22 |
| 2008/0028462 A1* | 1/2008 | Burtscher ....................... 726/22 |
| 2008/0120611 A1* | 5/2008 | Aaron ............................ 717/174 |
| 2008/0141376 A1* | 6/2008 | Clausen et al. ................. 726/24 |
| 2009/0049550 A1* | 2/2009 | Shevchenko .................... 726/23 |

* cited by examiner

METHOD OF DETECTING AND BLOCKING MALICIOUS ACTIVITY

CROSS-REFERENCE TO RELATED APPLICATIONS

This application is a Non-provisional application of U.S. Provisional Application No. 60/944,608, filed Jun. 18, 2007. The contents of which is hereby incorporated by reference in its entirety

TECHNICAL FIELD

The present invention generally relates to a method, system, computer readable medium of instructions and/or computer program product for determining the maliciousness of program code. In particular, the invention relates to determining the maliciousness of processes in computer memory once they are unpacked from a file and are at the initial stage of carrying out malicious activity.

BACKGROUND ART

Malicious software, also known as "malware" or "pestware", includes software that is included or inserted in a part of a processing system for a harmful purpose. Types of malware can include, but are not limited to, malicious libraries, viruses, worms, trojans, malicious active content and denial of service attacks. In the case of invasion of privacy for the purposes of fraud or the theft of identity, malicious software that passively observes the use of a computer is known as "spyware".

There are currently a number of techniques which can be used to detect malicious activity in a processing system. One technique, employed by many antivirus vendors, is file scanning. Many malware authors protect their executable files (which contain malicious code) by packing and/or encrypting them. Antivirus vendors update their file scanners with algorithms to unpack/decrypt the packed/encrypted files so that these files can then be scanned via signature-based detection. Once malware authors discover that antivirus vendors can now successfully unpack/decrypt and therefore, detect their samples, they then develop more sophisticated packers/encryptors in order to avoid detection. Both malware authors and antivirus vendors constantly advance their algorithms in order to outsmart each other. This becomes a cyclic process, in which the first half of the cycle involves malware authors advancing their packers/encryptors which successfully carries out an attack against a user by evading the user's antivirus software with unknown packers/encryptors. In the second half of the cycle, antivirus vendors upgrade their unpackers/decryptors in order to catch these new packers/encryptors. At this point, a user is protected by their antivirus software. Unfortunately, malware authors then advance their packers/encryptors and the cycle starts again. A problem with file scanning is that there are periods of time in which a user's computer system is vulnerable to attack due to the lack of proper unpackers/decryptors or emulation support from their antivirus vendor.

A more proactive detection method attempts to overcome the situation where malware includes signatures that are unknown to the processing system or which utilise anti-emulation tricks employed by malware authors that prevent protected threats from being emulated. The proactive detection method is designed to block unknown threats by judging activity carried out by a process. The method involves placing hooks on a number of important system activities (e.g. user-mode API and kernel-mode system services) such that whenever a process attempts to call an API or a system service, the proactive detection intercepts such a call, and inspects its parameters. If it finds that the parameters are suspicious enough, it will alert the user about suspicious action that is about to happen asking the user if the requested action should be allowed or should be blocked.

A problem with current proactive detection methods is that they are prone to a high rate of false positives due to their frequent triggering on various behaviours which are associated with processes being run by legitimate software applications.

Memory scanners attempt to overcome the false positive problem by performing periodic or on-demand scanning of memory contents in the system processor in order to detect generic signatures of known threats inside the running processes. Memory scanners are not prone to false positives as they only detect known threats. Thus, if the quality of the detection signatures is high, then the risk of a false positive is very low.

However, a problem with existing memory scanners is an issue of timing. That is, when to scan memory and when to scan a particular process. When a file is loaded into memory, it is not immediately available for scanning with the generic signatures because the file needs to be unpacked to run the code within the file. The time taken to unpack the file is variable and only once the file has been unpacked is it possible to scan the file with generic signatures in order to find out if the running process is a known threat. If the file is a malicious threat, it may initiate its malicious payload immediately upon completion of unpacking. The memory scanner may only block the execution of a malicious process when it establishes the fact that the process is malicious. The only time when it can do so is when it locates the signature of a known threat in a process. The only time it locates the signature is when it performs a process scan. Thus, the only time when such process scan will detect the known threat signature is after a threat is unpacked. If the memory scanner waits until the process unpacks itself then the process will initiate its malicious payload. The problem with existing memory scanners is that they are unable to resolve the timing issue of 1) scanning a process after it is unpacked (otherwise the signature will not be found) and 2) determining (and blocking) the process before it initiates its malicious payload (otherwise it's too late).

Current memory scanning solutions do not resolve the timing issue explained above.

Therefore, there exists a need for a method, system, computer readable medium of instructions, and/or a computer program product which can efficiently determine the maliciousness of program code which addresses or at least ameliorates at least one of the problems inherent in the prior art.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In a first broad form, the present invention provides a method of detecting and blocking malicious activity of processes in computer memory during unpacking of a file after the code and data contained in the file are unpacked, including the steps of:

(a) inserting a hook function into one or more un-assessed processes running in the computer memory;

(b) placing a hook on one or more system calls carried out by the one or more un-assessed processes; the one or more system calls determining an optimal time period in which to detect malicious activity in the un-assessed processes; and, during the optimal time period:

(c) suspending the one or more system calls carried out by the one or more un-assessed processes;

(d) detecting attributes of the one or more un-assessed processes; and (e) determining the likely maliciousness of the one or more un-assessed process from the attributes.

Preferably, the system call is a system call that is not associated with unpacking a file but is associated with in the initial stages of execution of a file. The system call may be a user level API. Alternatively, the system call may be a kernel-mode system service. The user level API may be any one of CreateMutex( ), RegOpenKey( ), RegOpenKeyEx( ), WSAStartup( ), CreateService( ), FindResource( ), CreateEvent( ), GetDriveType( ), AddAtom( ), CopyFile( ), CreatePipe( ), WinExec( ).

Preferably, at step (a) a hook function is inserted upon creation of a new un-assessed process.

Preferably, at step (e) the attributes of the process are compared with a database containing attributes associated with known malicious processes.

Preferably, at step (e) the attributes are code and data signatures.

Preferably, if at step (e) the one or more un-assessed processes are determined likely to be malicious, the method further includes the step of blocking the one or more malicious processes.

Preferably, blocking includes suspending the one or more malicious processes.

Alternatively, blocking includes terminating the one or more malicious processes.

In a further alternative, blocking includes suspending one or more threads associated with the one or more malicious processes. In yet another alternative, blocking includes suspending one or more threads associated with one or more processes determined unlikely to be malicious. Advantageously, by suspending some of the threads (having malicious code) associated with one or more non-malicious processes (i.e. legitimate processes that are determined to be unlikely to be malicious at step e), the one or more non-malicious processes can continue running while the threads containing malicious code are suspended.

In yet a further alternative, blocking includes deleting a file associated with the one or more malicious processes.

Alternatively, if at step (e) the un-assessed process is determined likely to be malicious, the method further includes the step of notifying a user. Preferably, at step (c) the one or more system calls are suspended for a pre-determined time period, after which, the one or more system calls are resumed. Preferably, if at step (e) the un-assessed process is determined unlikely to be malicious, the method further includes the step of resuming the one or more system calls carried out by the one or more processes.

Alternatively, if at step (e) the un-assessed process is determined unlikely to be malicious, the method further includes the step of resuming the one or more system calls carried out by the one or more processes.

The present invention also provides software for use with a computer including a processor and associated memory device for storing the software, the software including a series of instructions to cause the processor to carry out a method according to the first broad form of the invention.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
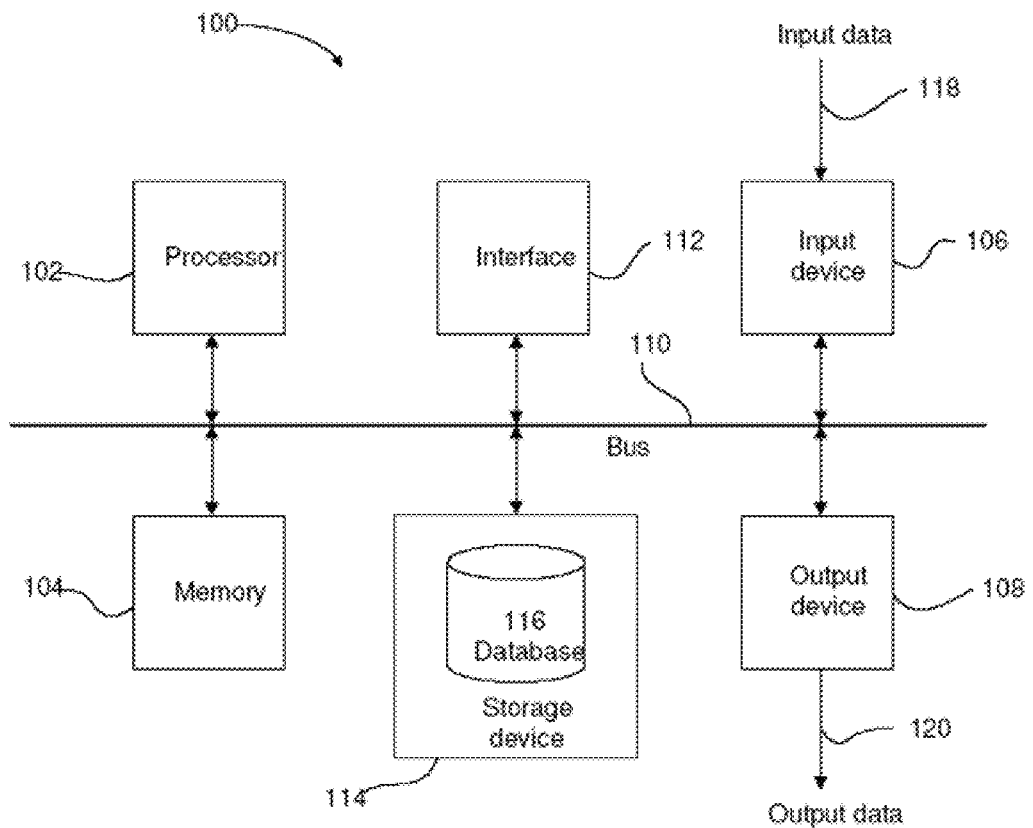
FIG. 1 illustrates a functional block diagram of an example of a processing system that can be utilised to embody or give effect to a particular embodiment.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Example of a Processing System

A particular embodiment of the present invention can be realised using a processing system, an example of which is shown in FIG. 1. The processing system 100 illustrated in relation to FIG. 1 can be used as a client processing system and/or a server processing system. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100. The memory 104 typically stores an operating system to provide functionality to the processing system 100. A file system and files are also typically stored on the storage device 114 and/or the memory 104.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 18 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 can be adapted to allow data or information to be stored in and/or retrieved from, via wired or wireless communication means, the at least one database 116. The interface 112 may allow wired and/or wireless communication between the processing unit 102 and peripheral components that may serve a specialized purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server processing system, specialised hardware, computer, computer system or computerised device, personal computer (PC), mobile or cellular telephone, mobile data terminal, portable computer, Personal Digital Assistant (PDA), pager or any other similar type of device.

The processing system 100 may be a part of a networked communications system. The processing system 100 could connect to a network, for example the Internet or a WAN. The network can include one or more client processing systems and one or more server processing systems, wherein the one or more client processing systems and the one or more server processing systems are forms of processing system 100. Input data 118 and output data 120 could be communicated to other devices via the network. The transfer of information and/or data over the network can be achieved using wired communications means or wireless communications means. The server processing system can facilitate the transfer of data between the network and one or more databases.

Interception

A hook (also known as a hook procedure or hook function), as used herein, generally refers to a callback function provided by a software application that receives certain data before the normal or intended recipient of the data. A hook function can thus examine or modify certain data before passing on the data. Therefore, a hook function allows a software application to examine data before the data is passed to the intended recipient.

An API ("Application Programming Interface") hook (also known as an API interception), as used herein as a type of hook, refers to a callback function provided by an application that replaces functionality provided by an operating system's API. An API generally refers to an interface that is defined in terms of a set of functions and procedures, and enables a program to gain access to facilities within an application. An API hook can be inserted between an API call and an API procedure to examine or modify function parameters before passing parameters on to an actual or intended function. An API hook may also choose not to pass on certain types of requests to an actual or intended function.

A hook chain as used herein, is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, others can modify messages or stop their progress through the chain, restricting them from reaching the next hook procedure or a destination window.

Method of Detecting and Blocking Malicious Activity

Figure 2:
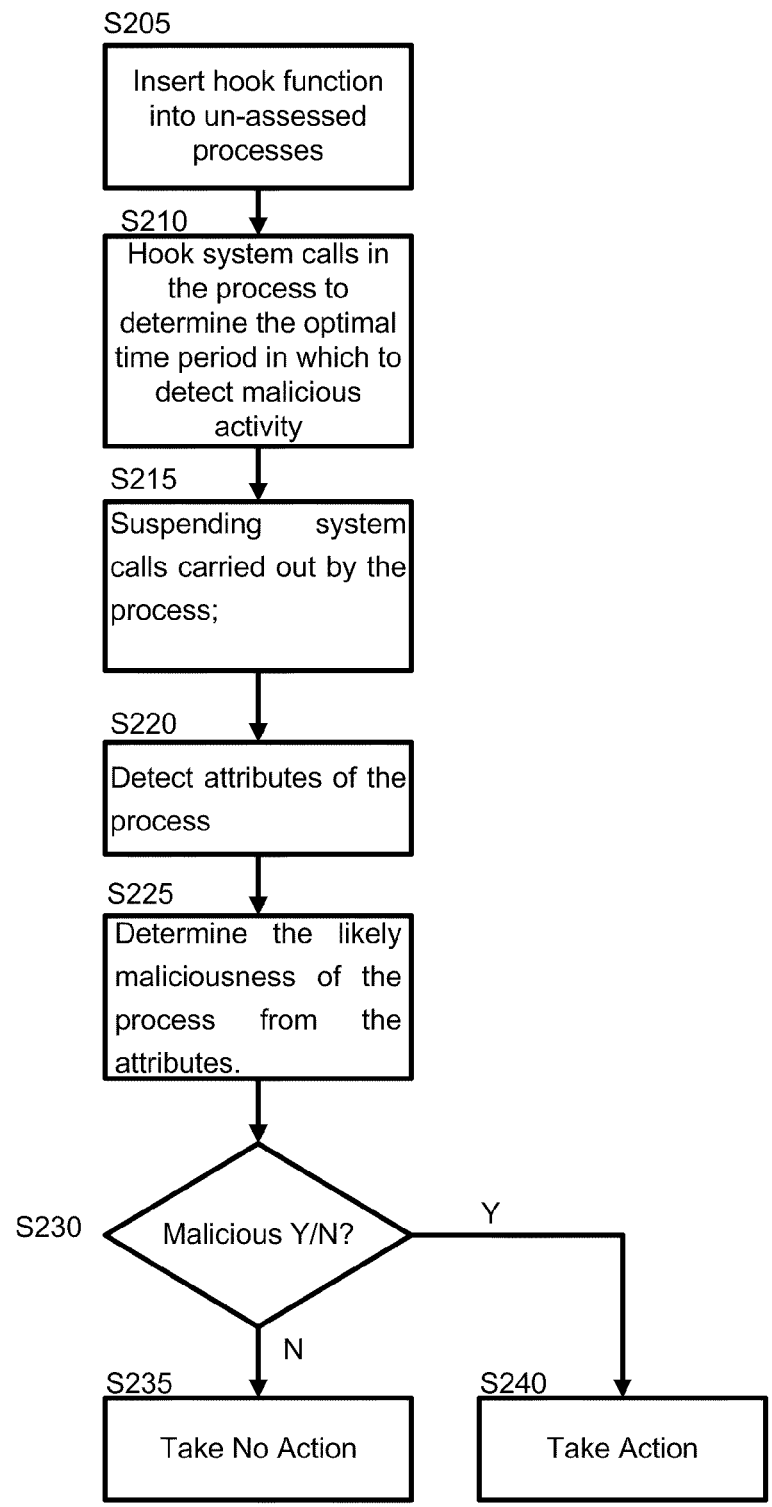
FIG. 2 illustrates a flow diagram of an example of a method of detecting and blocking malicious activity of processes in computer memory after unpacking the contents of a file.

Referring to FIG. 2, there is shown an example of a method 200 of detecting malicious activity of processes in computer memory 104 after unpacking the contents of a file. At step 205, a hook function is inserted into one or more un-assessed processes running in the computer memory 104. Preferably, whenever a new process is started in the system, additional memory 104 is allocated in the processing system 100 so that the hook function is injected into the newly created process. Step 205 results in every process running in the memory 104 having a hook function loaded within it such that the hook function can hook one or more system calls associated with the one or more un-assessed processes.

At step 210, one or more hooks are placed on one or more system calls carried out by the one or more un-assessed processes. By placing the hooks, the hook function has full control over the hooked system calls. The hook function can modify the parameters of the system calls and control the system calls. The system call may be an important call associated with the processing system 100, such as user-mode API and kernel-mode system services. Thus, whenever a process attempts to call an API or a system service, the hooking function intercepts the call, and can inspect its parameters. The hooks placed on the one or more system calls associated with the one or more un-assessed processes allow determination of an optimal time period in which to detect malicious activity in the un-assessed processes. Suitable system calls to hook are system calls that are not associated with unpacking a file but are associated with the initial stages of execution of a file. The hooks in the one or more processes are not designed to inspect the parameters and alert a user if the parameters look suspicious, as is implemented in existing proactive defence solutions. Rather, the hooking is used solely to signal to the memory scanning system the appropriate time to scan the hooked process. Advantageously, this approach allows the memory scanning system to suspend system calls in step 215 when the process attempts to carry out system calls that are not associated with unpacking a file but are associated with the initial stages of execution of a file. This step is explained in more detail in FIG. 3.

At step 215 the one or more system calls carried out by the one or more un-assessed processes are hooked and suspended until the likely maliciousness of the one or more un-assessed processes are determined at step 225. This step is explained in more detail in FIG. 6. At step 220, with the one or more system calls in the one or more un-assessed processes hooked and suspended, attributes of the process are determined. The attributes may include code signatures. Alternatively, the attributes may include both code and data signatures. In a further alternative, the code is disassembled and analysis of the disassembled code is carried out around the instruction pointer within the assessed process.

At step 225 the likely maliciousness of the un-assessed process is determined from the attributes. This may be determined by comparing known signatures with signatures in the code of the process. Alternatively, or in addition to comparing known signatures with signatures in the code, heuristic analysis of the process may be conducted. For example, detection of particular signatures may trigger a more comprehensive signature scan. Alternatively, searching for some signatures may have a weighting associated with it; such that as soon as the overall weighting of the detected signatures exceeds a threshold, then no further scan is required (i.e. based on the combination of signatures detected there is enough evidence to deduce that a process is malicious). For example, signatures A, B and C may be innocuous alone, but if they are all detected in the same process, then the process is likely to be malicious.

At step 230, if the process was determined to be non-malicious, control moves to step 235 where no action is taken. Alternatively, if at step 230 the process was determined to be malicious, control moves to step 240 where further action is taken. The further action taken at step 240 will depend on the settings of the memory scanning system but may include suspending the process or suspending some of the processes threads. Alternatively, the process could be terminated or a file associated with the process deleted. In a further alternative, the user may be notified of the problem and prompted to take further action.

Figure 3:
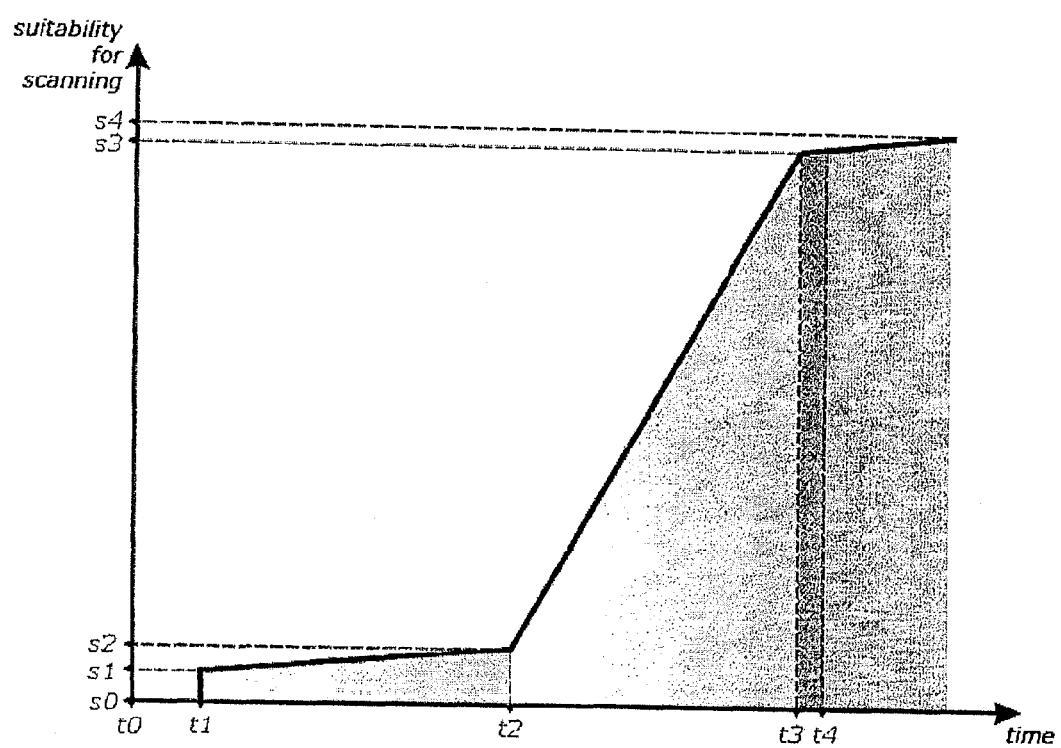
FIG. 3 is a timing diagram illustrating the unpacking of an executable file in a memory.

FIG. 3 is a timing diagram illustrating the unpacking of an executable file in a memory 104. The executable file contains two packers/encryptors that must be unpacked/decrypted to run the executable file.

At t0 an executable file (and the processes contained within it) is yet to be loaded into memory 104. At this stage, its suitability for memory scanning of the process is zero (s0).

At t1, the executable file is loaded in memory 104, but suitability for memory scanning of the process is low (s1) as the executable file is not yet unpacked. At s1, the only available code/data for scanning (e.g. with generic code signatures) is the first unpacked layer associated with the executable file. Given the fact that the code/data associated with the first unpacker layer on an executable file is normally a legitimate application, process scanning suitability s1 would be enough to detect the first packer only, but not enough to detect any actual threat.

There exist some packers/encryptors (developed by malware authors), such as Morphine, which have no or very limited legitimate usage. Some anti-virus vendors detect the packer itself at this stage, and block the file as suspicious only because a malware-specific packer was detected. An example of such packer detection is Bloodhound.Morphine by Symantec®. The present invention, however, does not consider s1 as sufficient for scanning suitability, because the threat itself (i.e. what kind of threat it is) cannot be identified at this stage.

At t2, the first packer has fully unpacked the embedded portion of data and passed control to a second unpacker.

Between t2 and t3, the suitability for scanning raises quickly as the second unpacker gradually unpacks the original executable file. More and more portions of code and data from the original file become available for scanning, until the unpacker completes its job by completely unpacking the executable file.

At t3, the original executable file is fully unpacked in memory 104. The optimal time to scan the one or more processes that the file attempts to run is just as the packer passes execution into the entry point of the original executable file.

The present invention at step 210 of FIG. 2, intercepts early system calls carried out by processes (such as early API calls) that are made between t3 and t4 in order to detect the moment of time suitable for scanning as close to t3 as possible.

Once early system calls are carried out (such as initial API calls) before t4, any further execution of the file becomes more and more of a potential threat, as malicious actions can be invoked after this stage. From t4 onward, the suitability for process scanning increases, as the potential threat would start decrypting some internal code/data. However, this suitability increase is a trade off due to the growing risk that the running code will actually compromise the system.

In light of the above, between t3 and t4 is the optimal time interval for scanning, because s3 is an appropriate and sufficient level for process scanning suitability.

While two packers/encryptors have been described, the actual number of packers/encryptors may vary. For example, there may be no packer/encryptor associated with a file, and in this case the t3 phase is achieved as soon as the file is loaded in memory 104 for execution. In this case, the intercepted API calls will be associated with the initial stage of execution of a file once it was loaded in memory. The memory scanning system will be as effective as it is with a heavily packed and encrypted file, the only difference is that the t3 phase occurs immediately.

In FIG. 3, the time intervals t1-t2 and t2-t3 may vary depending on the original executable file size or the packing/encryption algorithm used (or whether a packer/encryptor is used at all). Thus, it is not possible to predict how long it will take to unpack an executable file. As a result, the memory scanning system cannot use hard-coded delays (i.e. a fixed pre-determined value, not calculated by an algorithm) to start scanning the newly started process from the executable file. This is because a hard-coded delay that is too short would make process scanning equivalent to scanning a packed file as the process would still represent the packed file loaded in memory with no unpacked code/data. However, a hard coded delay that is too long would allow malicious code to cause the actual damage to the system, or the malicious sample would simply be allowed to terminate even before the scanner is triggered.

As noted above, the hooking at step 215 of FIG. 2 is used solely to signal the memory scanning system about the appropriate time to scan the hooked process. Suitable system calls to hook are system calls that are not associated with unpacking a file but are associated with the initial stages of execution of a file. This enables the memory scanning system to detect the malicious processes at the optimal time (i.e. just after t3 but before t4). An example of such a system call is the API call CreateMutex( ). This API is normally used by malware to make sure only one instance of the malware is running in memory. Traditionally, malware or virus authors put their own initials, banners, slogans, or simply some messages to the anti-virus vendors as the mutex name to be created. The operating system of the processing system 100 fails to create a mutex if it is already created in memory, so if the same malware is run in a parallel process, the malware will fail to create the second mutex, and therefore the malware will know it needs to quit.

Packer/encryptor code is designed to reduce the size of the original file and/or protect it in order to make reverse-engineering of such file difficult. A packer/encryptor is designed to protect various files (normally executable and DLL files) which should normally be allowed to run simultaneously. Therefore, a packer/encryptor would never normally call CreateMutex( ) as it does not need to block any execution of the underlying executable.

These factors make CreateMutex( ) interception a very effective mechanism of determining (1) when the packer/ encryptor has finished its job (just prior to t3); (2) when the original executable, unpacked by it, immediately starts its own execution (t3); and (3) before the actual payload is invoked (t4).

Another example of a suitable system call which is not associated with unpacking a file but is associated with the initial stages of execution of a file is any API that is normally used during process initialisation. For example, a vast majority of malware threats would firstly register themselves in the registry before the actual payload is invoked, so RegOpenKey( )/RegOpenKeyEx( ) API interception is effective.

Another example of a suitable system call, for a network-aware threat, is WSAStartup( ) API, because it would be needed to initiate the network sockets provided by Ws2_32.dll. Alternatively, the CreateService( ) API may be useful for a threat that attempts to install a kernel-mode rootkit into the system. Further examples of suitable system calls include FindResource( ), CreateEvent( ), GetDriveType( ), AddAtom( ), CopyFile( ), CreatePipe( ), WinExec( ). All of these APIs are encountered at the early stages of execution of a file. Because the abovementioned APIs are very unlikely to be met in any existing packers/encryptors due to their specific nature, proper timing (i.e. between t3 and t4) can effectively be provided.

Example: Rustock Rootkit

Rustock rootkit is a challenging threat to be detected and removed by malware software. The method of the present invention stops the threat by intercepting it before it can do any damage to the processing system.

The Rustock rootkit threat is protected by a polymorphic encryptor that bypasses many commercial software emulators and unpackers/decryptors. As a result, every single build of this rootkit remains undetected. However, only a small number of short signatures are required to intercept the dropper of this rootkit when it attempts to install the kernel mode driver. However it is critical to intercept the dropper before the kernel-mode driver is installed. The method of the present invention allows the memory scanning system to intercept the threat even before the kernel-mode driver is installed, terminate the rootkit dropper process at an early stage and delete its file. No further remediation is required as the system remains in a clean state.

In contrast, conventional memory scanners would not detect the Rustock dropper due to the inability to detect proper timing, that is, the optimal time to scan the dropper process.

The present invention at step 210 of FIG. 2 and further described in FIG. 3, detects suitable system calls to hook (i.e. system calls that are not associated with unpacking a file but are associated with the initial stages of execution of a file). Hooks are inserted in one or more processes but are not designed to inspect the parameters and alert a user if the parameters look suspicious, as is implemented in the existing proactive defence solutions. Rather, the hooking is used solely to signal to the memory scanning system the appropriate time to scan the hooked process. Advantageously, this approach allows the memory scanning system to suspend system calls (as in step 215 of FIG. 2) when the process attempts to carry out system calls that are not associated with unpacking a file but are associated with the initial stages of execution of a file.

The Rustock dropper process "lives" for only a very short period of time (in order to bypass malware detection software). Once loaded, it decrypts itself. Off-line file analysis is nearly impossible due to the extremely difficult nature of the applied polymorphic encryptor. Next, it detaches an embedded kernel-mode driver and installs it as a driver. It then quits and deletes its own file with the help of the installed driver.

The time period available to scan this process is extremely narrow and cannot be guessed by applying hard-coded delays. A "let's wait and then scan" approach would fail. The present invention identifies the optimal moment in time to scan the dropper process (based on hooking certain system calls in order to signal to the memory scanning system) so that this threat is detected and blocked (i.e. either deleting a file, a process, suspending a process or suspending one or more threads in a process). A number of APIs are found during the initial states of execution of the Rustock dropper including FindResource( ), CreateEvent( ), GetDriveType( ), AddAtom( ), CopyFile( ), CreatePipe( ), WinExec( ).

Example: Agobot/Gaobot

Another example is the Agobot/Gaobot family (also known as Spybot or Randex bots). There are hundreds of thousands of different variants in these families of bots due to the publicly available source code. The conventional way of detecting these threats is based on sample unpacking and/or emulation with the subsequent applying of detection signatures. Despite this family of bots having evolved very slowly (with the basic functionality remaining the same over a number of years) they are still a large problem for conventional malware because the bots are constantly being repacked with various packers/encryptors (including newly evolving packers/encryptors). Thus, every time an Agobot/Gaobot is repacked (for example with a new packer/encryptor), it bypasses many conventional file detectors. This is despite the fact that virtually one signature is able to detect nearly ALL samples of Gaobot (once it is fully unpacked in memory). Thus, the present invention provides an effective solution to stop Agobot/Gaobot type threats. Advantageously, the present invention need not carry a large set of definitions (as many anti-virus solutions do) because it does not need to enumerate hundreds of thousands of signatures against the protected samples—it needs just a few against un-protected samples—once they are loaded in memory but before they have had an opportunity to fully execute.

Figure 4:
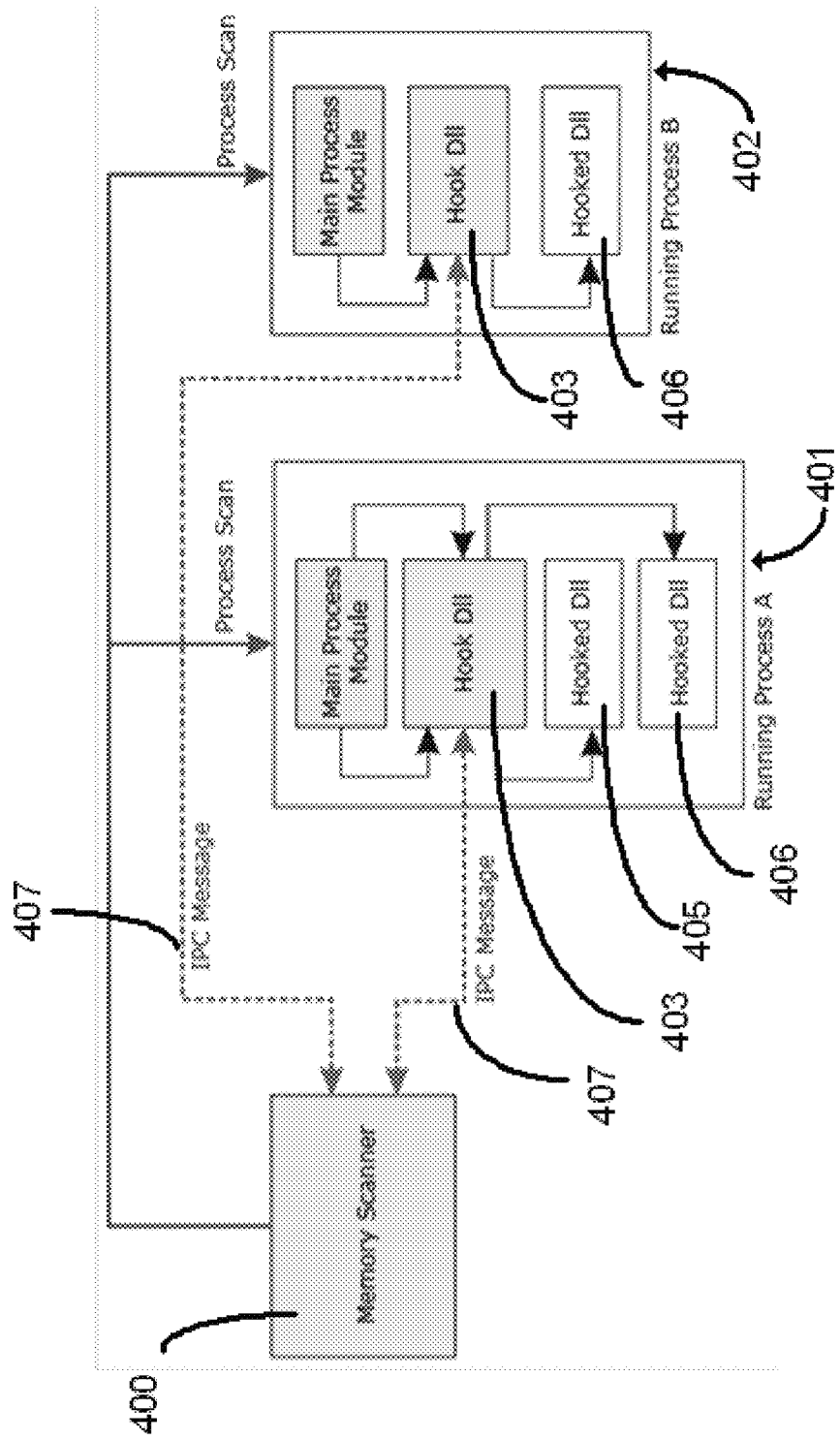
FIG. 4 illustrates a data flow diagram of the malicious activity detection system.

FIG. 4 illustrates a data flow diagram of the present invention for two processes 401, 402 running in a memory 104. The memory scanning system 400 installs pre-selected hooks on system calls associated with the processes 401, 402 by injecting a hook function 403 into all running processes. While only two processes are shown 401, 402, it will be appreciated that many more processes can simultaneously be scanned. The memory scanning system 400 also installs a kernel-mode driver that sets a callback routine by calling the function PsSetCreateProcessNotifyRoutine( ). The result of this is that whenever a new process is started in the processing system 100, the kernel-mode driver gets notified about this event. Once notified, the driver will allocate virtual memory in the newly created process and inject hook function 403 into it. The result is that every running process in the system will have a hook function 403 loaded within it. Once loaded, the hook function 403 places one or more hooks on some pre-selected system calls 405, 406. The method of initialising the hook function 403 so that it may hook system calls is further described in FIG. 5. These system calls may include, for example, CreateMutex( ), RegOpenKey( ), RegOpenKeyEx( ) as described with reference to FIG. 3. By placing those hooks, the hook function 403 has full control over the hooked system calls 405, 406 and it can modify parameters (such as API parameters) of the hooked system calls, call the original API in the hooked system call 405, 406, and return either true or modified return values back to the caller.

When a hooked system call 405 or 406 occurs within a process (such as a pre-selected API call), the hook function 403 constructs an IPC (Interprocess Communication) 407 between the process 401, 402 and the memory scanning system 400. The IPC 407 contains a process ID which identifies the process and the hooked system call 405, 406.

Once the hook function 403 has sent the newly constructed IPC 407 into the memory scanning system 400, the hook function 403 suspends the intercepted system call 405, 406 for some time until it receives a response back from the memory scanning system 400. The method of hooking and suspending is explained in more detail in FIG. 6.

Once the memory scanning system 400 receives the IPC 407 from the hook function 403, the memory scanning system 400 decodes the IPC and retrieves the process ID (a unique identifier that points out the process from which the IPC message has arrived). The memory scanning system 400 identifies what process needs to be scanned via the process ID, and the memory scanning system 400 queries this ID in an internal cache of scanned processes to find whether the process 401, 402 has been scanned recently or not.

If the identified process was scanned recently, the memory scanning system 400 will send an IPC 407 back to the process 401, 402 that attempted to call the intercepted API and allow it to resume.

If the memory scanning system 400 detects no malicious activity in the process 401, 402, it sends back an IPC 407 to the hook function 403 to resume the system call 405, 406. When the hook function 403 receives IPC 407 from the memory scanning system 400, it passes the intercepted API request to the original DLL, receives a reply from it, and returns the API call back to the caller.

If the process 401, 402 was not scanned at all, or if it was not scanned recently, the memory scanning system 400 will register the new process scan in its internal cache and then scan the process 401, 402. The memory scanning system 400 scans the actual code that is being executed in various threads inside the processes which are tied to other resources, such as files. The memory scanning system 400 would firstly scan the running code and data that the running code relies on in order to detect if it is malicious. If the scan of the process establishes that the process is malicious, the memory scanning system 400 can take further action such as identifying what module the detected malicious code belongs to, and then, if possible, find out if there is a file associated with such module, and if such file removal would be an effective counter measure against such threat. Alternatively, other action may be taken depending on the settings of the memory scanning system 400.

For example, depending on the settings, the memory scanning system may terminate the process and then delete the file that is associated with the process; suspend the processes threads within which the malicious signatures were detected; engage its kernel-mode driver to remove/corrupt the sample if it is locked and is loaded into the address space of system processes (e.g. as a Winlogon notification package); inform the user about potentially unsafe application running (e.g. if a detected application is legitimate by itself, but can be used for malicious purposes) and/or perform other remediation actions, depending on software settings and rules. Other remediation actions may include for example cleaning the registry by enumerating all of the registry entries and removing registry entries that are associated with the detected file (e.g. to un-register malicious DLLs). Alternatively, or in addition to other remediation actions, the scanner may also suggest rebooting the system into safe mode to run a full system scan with a conventional file scan engine, such as antivirus, or it may schedule file removal and suggest the user to reboot from a recovery CD that is supplied with the memory scanner. Once booted, the recovery CD will analyse the protected file removal schedule, retrieve information on what files need to be deleted, and then delete those files. Depending on the action taken, the changes may be reflected in the internal memory scanning system cache.

Alternatively, depending on the settings, if the memory scanning system 400 detects data/information associated with a file that is traditionally known as a threat, the memory scanning system 400 considers if such data/information needs to be destroyed or damaged as one of important steps in preventing re-introduction (reinfection) of the threat without causing system instability.

In a further alternative, whenever the memory scanning system 400 detects malicious code within a running process, it may determine if the affected memory page belongs to a particular module. If the virtual address and virtual size of the affected memory page indicate that such page belongs to a range of memory where a recognised module was loaded to, then removal or damaging of a file that is associated with that module can be considered by the memory scanning system 400 as an effective counter-measure against such a threat.

If the module is identified as the main executable module, the memory scanning system 400 may suspend its threads, destroy or damage its executable by engaging its direct disk access (e.g. by using its kernel mode driver), clean its traces in the registry, then terminate the process, and attempt to delete/damage the executable file again (optionally).

If the identified module is a DLL loaded either statically or dynamically, the memory scanning system 400 may still consider to suspend its threads, destroy or damage its executable by engaging its direct disk access (e.g. by using its kernel mode driver) and clean its traces in the registry. Termination of the process may be omitted in this case if it is considered to be unsafe (for example, termination of winlogon.exe due to a detected malicious Winlogon Notification Package loaded into its address space which would crash the session).

If the affected page (in memory) does not belong to any module, then the memory scanning system 400 assumes it was dynamically allocated in the address space of the running process by some code that runs inside the current process, in another process, or in a kernel-mode driver. As it is not clear to the memory scanning system 400 what file stores the malicious code, it may not delete or damage any files at this stage. Rather, it may suspend any malicious threads that run within the allocated memory page(s). At this point, the memory scanning system 400 may engage a proactive defence monitor to find out the source of the code that allocated, injected the malicious code, and started a remote thread to execute the injected malicious code. In order to find out which process injected the malicious code into the place where it was found by the memory scanning system 400, the memory scanning system 400 may hook a number of APIs that are responsible for injecting the code into the virtual space of another process. For example, VirtualAllocEx( ), CreateRemoteThread( ), WriteProcessMemory( ), LoadLibrary( ). By hooking these APIs, the memory scanning system 400 would not only scan the processes that call these APIs but, more importantly, it would build a map of routes in order determine which processes have injected which code and where. This map may be populated every time memory operations are performed. The part of the memory scanning system 400 that builds such map is a monitor, as it simply monitors calls and does not scan anything. As soon as the memory scanning system 400 detects malicious code, but fails to establish what file is associated with the malicious code, it looks up the map constructed by the monitor to find which process injected the code and the address of the process, as this code was found to be malicious. This way, the memory scanning system 400 can identify the source of the malicious code—be it a process or a kernel-mode driver, even if the source contains malicious code/data that is encrypted, and therefore, not detected by the scanner. The proactive defence monitor of the memory scanning system 400 may be engaged at this point only (in order to reduce the load onto the system), or it may be switched on all the time, by tracing all memory operations, such as memory allocation and copying, that take part in the system. Typically, a thread injection chain would normally consist of two nodes: source and destination, so the memory scanning system 400 would simply look-up and establish the source of memory infection. It is possible, however, that future threats will have a bigger number of the nodes in the thread injection chain, so that the memory scanning system 400 will need to resolve a more complex maze in order to establish the code from which the entire thread injection chain originates. By establishing the source, the memory scanning system 400 would then repeat its logics to find out if there is a file associated with that code, and if that file removal/damage would be an infection remediation procedure.

While trying to establish the source of the code that causes the problem, it is possible that the memory scanning system 400 would be unable to remove the threat. However, it would still be able to block the threat by suspending its threads. It would also be able to inform the user that a complex threat was blocked but the removal has failed so the user needs to engage more intrusive methods, such as booting from another unaffected partition to scan the system with a traditional anti-virus solution, or reformatting and reinstalling the affected partition if all other methods fail.

Advantageously, the type of packer/encryptor used to protect the file from which the malicious code and data are loaded is not relevant, as the memory scanning system 400 never needs to inspect the contents of such a file. If a file is corrupted so that it would never run, the memory scanning system 400 would never remove it as there is no malicious code running that is ever associated with such file.

Figure 5:
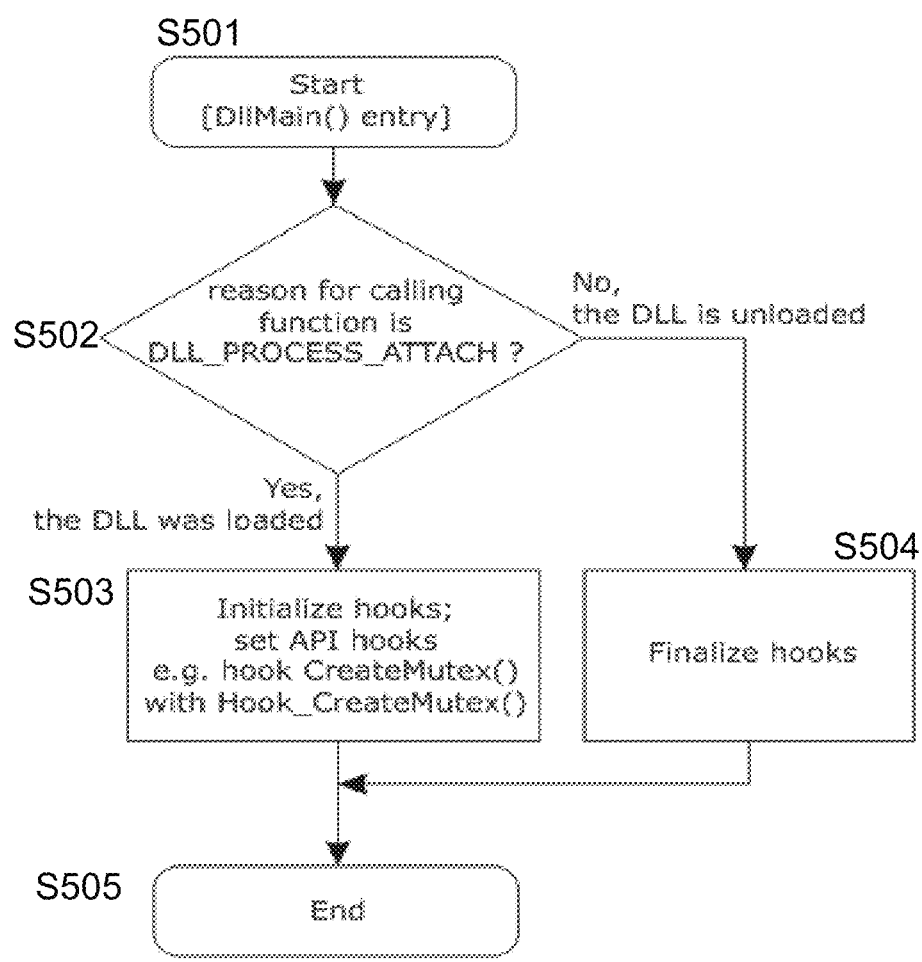
FIG. 5 illustrates a flow diagram of the method of initialising a hook function to detect malicious activity.

FIG. 5 illustrates a method of initialising the hook function so that the hooking function may hook system calls. Once the memory scanning system 400 loads a DLL (within which is hook function 403) into all running processes 401, 402, the hooking function 403 will hook system calls according to the method 500 illustrated in FIG. 5. At step 501 the method starts (i.e. the entry point of the injected hook DLL starts from DllMain( ) function) and at step 502 the method determines whether the DLL was loaded or whether the DLL was unloaded. If the DLL was loaded then control moves to step 503 where the hooks are initialised on system calls carried out by the process (e.g. setting API hooks on CreateMutex( ) for example) and the process ends at step 505. If at step 502, the DLL is being unloaded, then control moves to step 504 where all of the hooks are removed. If the operating system associated with the memory scanner unloads this DLL without taking off the hooks, then the process that hosts this DLL may crash because of a memory violation error. In order to prevent this happening, the hooks must firstly be removed before the DLL is allowed to be unloaded.

Figure 6:
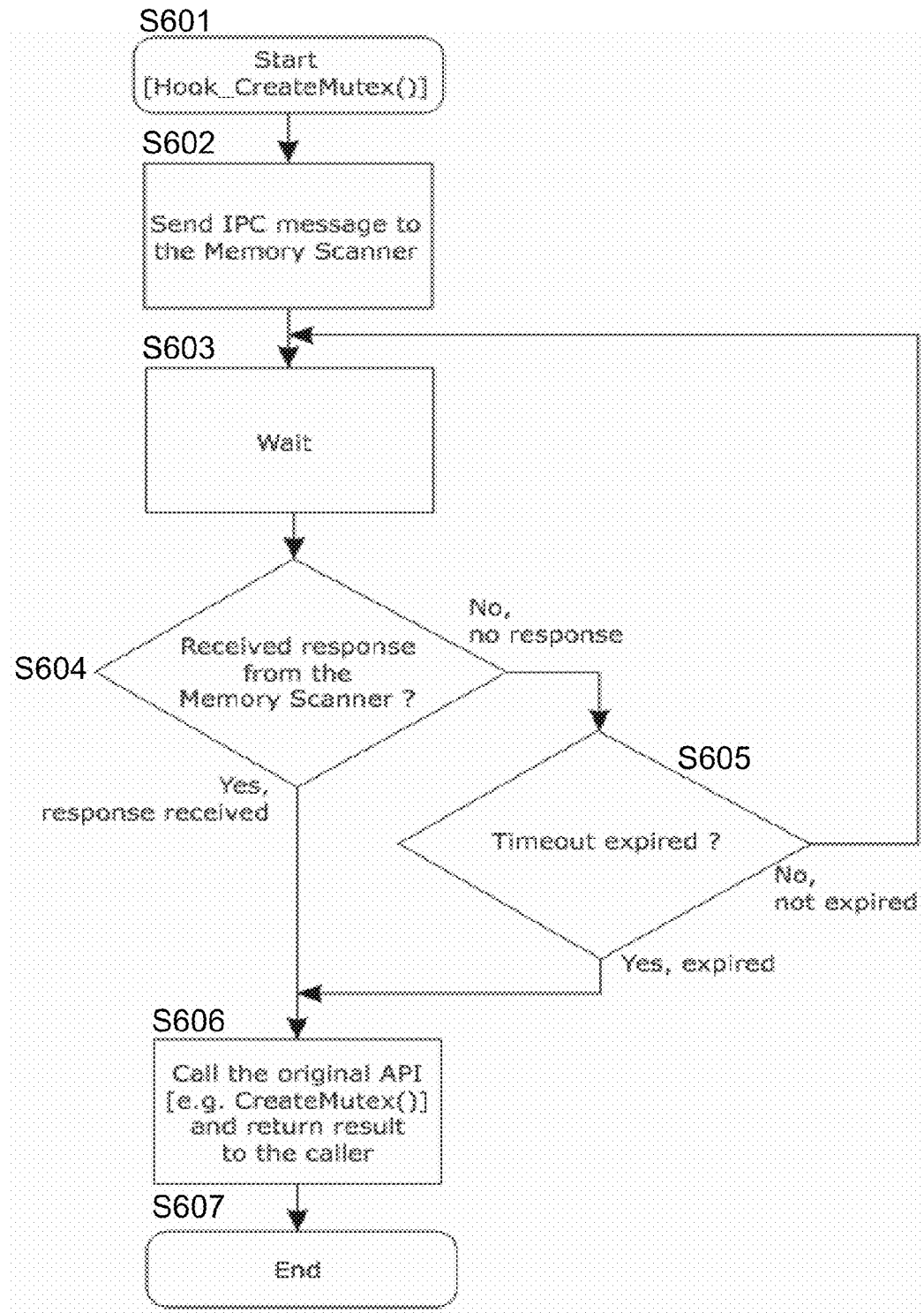
FIG. 6 illustrates a flow diagram of the method of hooking one or more system calls carried out by the one or more un-assessed processes to detect malicious activity.

FIG. 6 illustrates in further detail a method 600 of hooking and suspending a system call (in this case an API call) so that a process can be scanned. At step 601 the method begins and a system call (in this case createMutex API) has been hooked. At step 602, an IPC is sent to the memory scanning system 400 to request the memory scan. The system call is suspended until the scanner returns an IPC to the DLL, then the DLL calls the original function, and returns the result to the caller—the caller is suspended until the called function (which is hooked) returns. The message is sent in a synchronous call so the calling thread is suspended until the scanner returns an IPC in response. At step 603 the method waits for an IPC response from the memory scanning system 400. During this time, at step 604 the method repeatedly checks if an IPC response has been received from the memory scanning system 400. If no IPC response is received from the memory scanning system 400 at step 604 then control moves to step 605 where the method checks if a predetermined timeout has expired. If the timeout has not expired, control moves back to step 603 where the method waits for an IPC response from the memory scanning system again. If the timeout has expired then control moves to step 606 where the original API is called and its result is returned back to the caller—this will allow the caller to resume because the caller was waiting for response from the function that it calls; if the scanner decides that the process is malicious, it will not return an IPC—it will simply block the process by terminating it while it's waiting for an IPC response. If at step 604 a response is received from the memory scanning system, control moves to step 606 where the original API is called and its result is returned back to the caller. Regardless of whether the timeout expired at step 605 or a valid response was received from the scanner at step 604, if the scanner is busy, for example, the caller cannot be kept waiting for long. If the scanner is available, then the DLL provides the scanner with a chance to scan its host process; but if the scanner does not return an IPC to the DLL or does not terminate the process, then the DLL takes responsibility to proceed—that is, call the original API that the caller wanted and return it the result of the original API so that the caller continues running.

In the case where the DLL receives the IPC from the scanner after the DLL decided not to wait and keep running (calling the original API), it will discard the IPC as obsolete. At step 607 the method ends.

Figure 7:
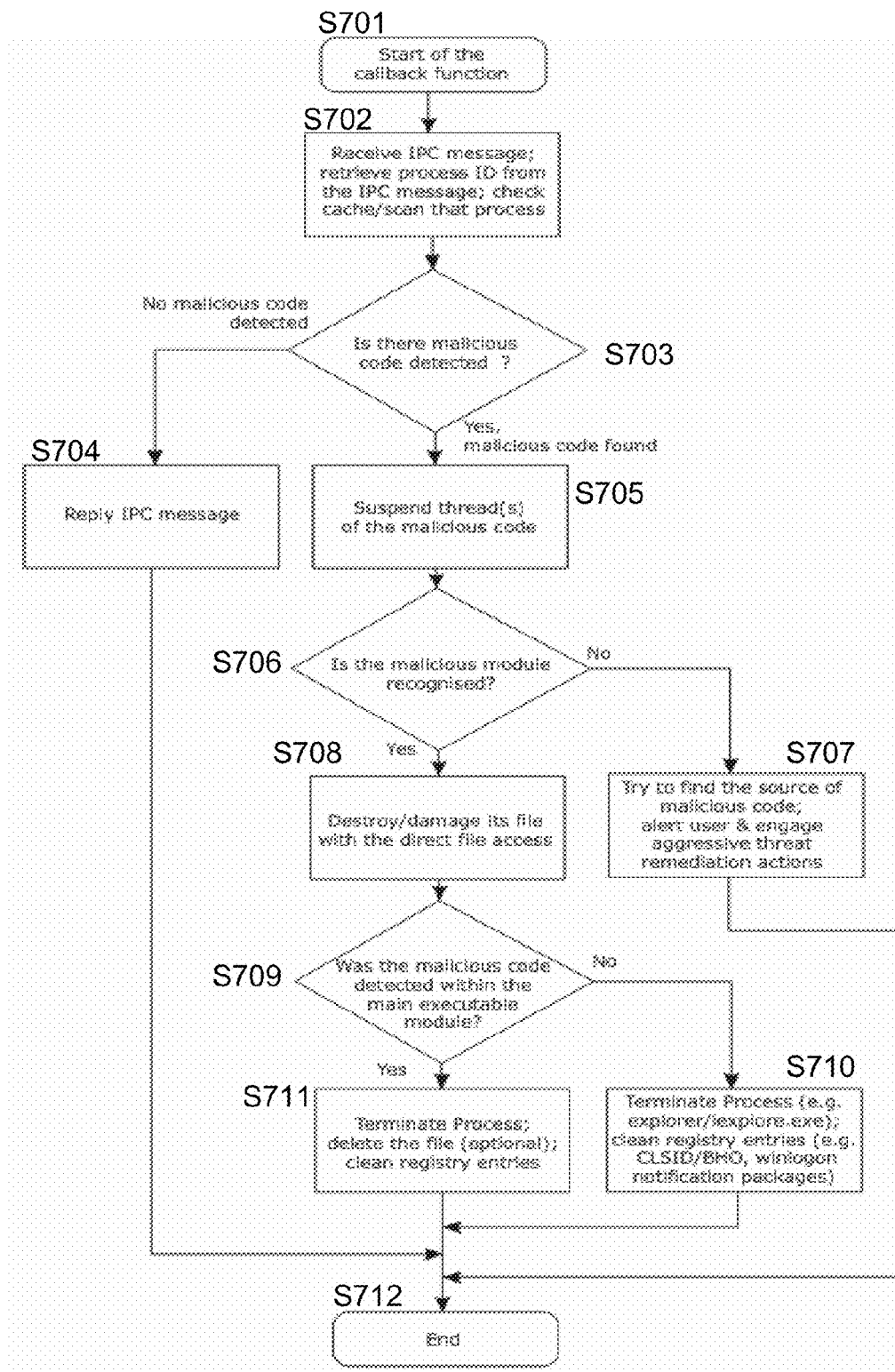
FIG. 7 illustrates a flow diagram of a detailed example of the method of detecting and blocking malicious activity of processes in computer memory after unpacking the contents of a file.

FIG. 7 illustrates in further detail a method 700 of invoking the memory scanning system once a new IPC message is received. At step 701a callback function starts and at step 702 one or more IPC's 407 are received from a process. The IPC 407 contains a process ID which identifies the process the IPC is associated with. The cache of the memory scanning system is checked to see if it has been scanned before, and if not, is scanned. At step 703, if no malicious code is detected in the process, control moves to step 704 where a reply IPC 407 is sent from the memory scanning system 400 to the process (e.g. 401 or 402 of FIG. 4) advising that the process is clear to perform that system call and the method ends at step 712. If malicious code was detected by the memory scanning system at step 703 then control moves to step 705 where one or more threads associated with the process are suspended. The malicious code is determined at step 703 by scanning the entire address space of the process with the signatures from a database. At step 706 the memory scanning system 400 determines if the malicious code is recognised within a module. Once the scanner has determined the code to be malicious, the scanner needs to find the file that is associated with that code. Given that the modules loaded into the processes are known and their address ranges are known; it is possible to look up what module address range the detected code belongs to, in order to determine what module the code belongs to, and, in turn, what file is associated with that module. If the malicious module is not recognised (i.e. the system could not recognise in which module the malicious code resides), control moves to step 707 where the memory scanning system tries to find the source of the malicious code, and alerts the user and engages aggressive threat remediation actions in order to find the source of the malicious code. For example, at this stage, the system knows there is malicious code, but it cannot determine the module (be it a main process module, or a loaded DLL), therefore, the system can't determine the file associated with the malicious code and therefore cannot delete the malicious file. Given the above, the system may advise the user that malicious code was detected but was unable to be easily remedied. The system may advise the user to engage the proactive defense monitor (as described in FIG. 4) so that memory allocations can be traced. The process then ends at step 712.

If at step 706, the malicious module is recognised, then control moves to step 708 where the memory scanning system 400 attempts to destroy or damage the executable or a DLL associated with the malicious code via direct disk access (e.g. by using a kernel mode driver). Control then moves to step 709, where the memory scanning system returns whether the malicious code was detected within the main executable module. If it was not (i.e. it was a DLL not an executable) then control moves to step 710 where the process is either terminated and/or the registry entries are cleared (e.g. if it's a DLL, then it could be that the system cannot terminate the process, for example winlogon.exe, and the system destroys or damages the DLL file by engaging its direct disk access and/or cleans the registry) and the process ends at step 712. If at step 709, the malicious code was detected within the main executable module, control moves to step 711 where the process is terminated and registry entries are cleaned and the file is optionally deleted before the method ends at step 712.

The method of the invention may be implemented separately as stand-alone software or in combination with currently known systems/methods as a software package.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention. For example, to avoid misclassification, a minimum number of system calls and attributes of unknown processes may be detected before these behaviours are compared with attributes and system calls associated with known malicious and non-malicious processes to determine the likelihood of that process being malicious.

The invention claimed is:

1. A method of detecting and blocking malicious activity of processes in computer memory during unpacking of a file after the code and data contained in the file are unpacked, including the steps of:
   (a) inserting a hook function into a process running in the computer memory, the hook function placing a hook on a system call carried out by the process;
   (b) receiving a first inter-process communication (IPC) constructed by the hook function, the first IPC comprising a process ID, the process ID identifying the process and the system call carried out by the process, wherein the hook function is configured to suspend the system call carried out by the process upon constructing the first IPC;
   (c) using the process ID to query a cache of scanned processes to determine whether the process has been scanned within a predetermined time period;
   (d) upon determining the process has not been scanned within the predetermined time period, initializing a scan of the process that carried out the system calls to determine the likelihood of the process being malicious;
   (e) upon determining the process has been scanned within the predetermined time period, sending a second IPC to the hook function, the second IPC comprising an instruction to the hook function to allow the system call carried out by the process to resume.

2. The method of claim 1, wherein the system call is a user level API.

3. The method of claim 2, wherein the user level API is anyone of CreateMutex( ), RegOpenKey( ), RegOpenKeyEx( ), WSAStartup( ), CreateService( ), FindResource( ), CreateEvent( ), GetDriveType( ), AddAtom( ), CopyFile( ), CreatePipe( ), WinExec( ).

4. The method of claim 1, wherein the system call is a kernel-mode system service.

5. The method of claim 1, wherein at step (f) the attributes of the process are compared with a database containing attributes associated with known malicious processes.

6. The method of claim 1, wherein at step (f) the attributes are code and data signatures.

7. The method of claim 1, wherein if at step (g) the process is determined likely to be malicious, the method further includes the step of blocking one or more malicious processes.

8. The method of claim 7, wherein blocking includes suspending the one or more malicious processes.

9. The method of claim 7, wherein blocking includes terminating the one or more malicious processes.

10. The method of claim 7, wherein blocking includes suspending one or more threads associated with the one or more malicious processes.

11. The method of claim 7, wherein blocking includes suspending one or more threads associated with one or more processes determined unlikely to be malicious.

12. The method of claim 7, wherein blocking includes deleting a file associated with the one or more malicious processes.

13. The method of claim 1, wherein if at step (g) the un-assessed process is determined likely to be malicious, the method further includes the step of notifying a user.

14. The method of claim 1, wherein at step (b) the system call carried out by the process is suspended for a pre-determined time period, after which, the system call is resumed.

15. The method of claim 1, wherein at step (a) the hook function is inserted upon creation of a new process.

16. A computing device configured to detect and block malicious activity of processes in memory of the computing device during unpacking of a file after the code and data contained in the file are unpacked, the computing device comprising:
   a processor;
   memory in electronic communication with the processor;
   instructions stored in the memory, the instructions being executable by the processor to:
      insert a hook function into a process running in the memory of the computing device, the hook function placing a hook on a system calls carried out by the process;
      receive a first inter-process communication (IPC) constructed by the hook function, the first IPC comprising a process ID, the process ID identifying the process and the system calls carried out by the process, wherein the hook function is configured to suspend the system call carried out by the process upon constructing the first IPC;

use the process ID to query a cache of scanned processes to determine whether the process has been scanned within a predetermined time period;

upon determining the process has not been scanned within the predetermined time period, initialize a scan of the process that carried out the system calls to determine the likelihood of the process being malicious;

upon determining the process has been scanned within the predetermined time period, send a second IPC to the hook function, the second IPC comprising an instruction to the hook function to allow the system call carried out by the process to resume.

17. A computer-program product for detecting and blocking malicious activity of processes in memory of the computing device during unpacking of a file after the code and data contained in the file are unpacked, the computer-program product comprising a non-transitory computer-readable medium having instructions thereon, the instructions comprising:

code programmed to insert a hook function into a process running the memory of the computing device, the hook function placing a hook on a system call carried out by the process;

code programmed to receive a first inter-process communication (IPC) constructed by the hook function, the first IPC comprising a process ID, the process ID identifying the process and the system call carried out by the process, wherein the hook function is configured to suspend the system call carried out by the process upon constructing the first IPC;

code programmed to use the process ID to query a cache of scanned processes to determine whether the process has been scanned within a predetermined time period;

upon determining the process has not been scanned within the predetermined time period, code programmed to initialize a scan of the process that carried out the system calls to determine the likelihood of the process being malicious;

upon determining the process has been scanned within the predetermined time period, send a second IPC to the hook function, the second IPC comprising an instruction to the hook function to allow the system call carried out by the process to resume.

* * * * *